June 24, 1947. G. H. KAEMMERLING 2,422,683

RUBBER MOUNTING

Filed Sept. 1, 1944

Inventor
Gustav H Kaemmerling
By Ralph Hammar
Attorney

Patented June 24, 1947

2,422,683

UNITED STATES PATENT OFFICE 2,422,683

RUBBER MOUNTING

Gustav H. Kaemmerling, Erie, Pa., assignor to Lord Manufacturing Company, Erie, Pa., a corporation of Pennsylvania.

Application September 1, 1944, Serial No. 552,298

8 Claims. (Cl. 248—358)

1

The present invention relates to vibration absorbing rubber mountings and is particularly concerned with a structure for use with concentric load supporting members in which the load is taken by rubber in shear and the necessity for bonding is eliminated. Further objects and advantages will be pointed out in the specification and claims.

Figure 1:
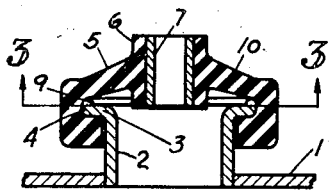
Figure 4:
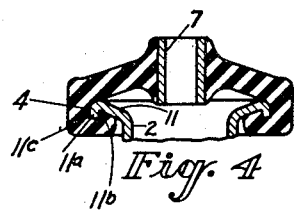
Figure 2:
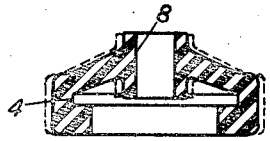
Figure 5:
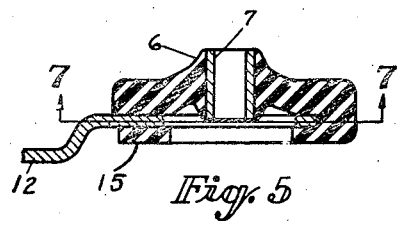
Figure 3:
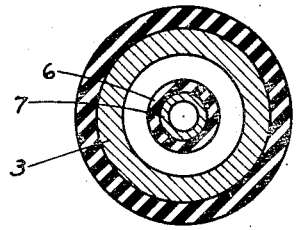
Figure 6:
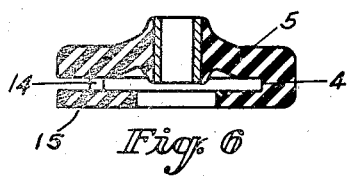
Figure 8:
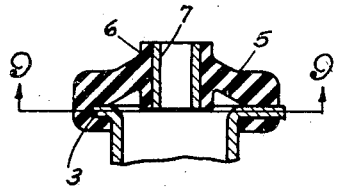
Figure 7:
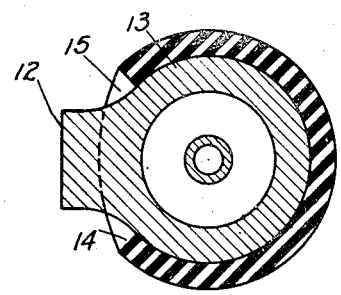
Figure 9:
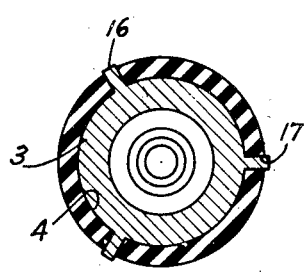

In the accompanying drawing, Fig. 1 is a sectional elevation of a mounting embodying my invention; Fig. 2 is a sectional view of the rubber disk; Fig. 3 is a sectional view on line 3—3 of Fig. 1; Fig. 4 is a sectional view of a modification; Fig. 5 is a sectional view of another modification of the mounting; Fig. 6 is a section of the rubber disk; Fig. 7 is a sectional view on line 7—7 of Fig. 5; Fig. 8 is a sectional elevation of another modification; and Fig. 9 is a sectional view on line 9—9 of Fig. 8.

Referring to the drawing, there is shown a support 1 having fixed thereto an upstanding cylinder 2 with an outwardly projecting flange 3 at its upper edge received in an inwardly extending groove 4 in a rubber disk 5. At the center of the disk is a hub 6 in which is pressed a hollow pin 7 for attachment to a load which is resiliently supported by the shear section of rubber between the hub and the bottom of the groove 4. The rubber disk is molded to the shape shown in full lines in Fig. 2, in which the hole 8 in the hub receiving the hollow pin is shown as somewhat smaller than the outside diameter of the pin and the groove 4 is somewhat smaller than the outside diameter of the flange 3.

When assembled the rubber disk is stretched to the position indicated by dotted lines, providing a tension grip on the flange and on the pin. To increase the shear load supporting section of the disk, the flange 3 is provided with an upstanding rim 9 received in the bottom of the groove 4 which holds the tapered surface 10 of the disk away from the upper surface of the flange during normal operation. If the tension grip on the flange 3 and pin 7 is insufficient to prevent sliding, the grip may be increased by the addition of the use of rubber cement.

In the modification shown in Fig. 4, the cylindrical member 2 is provided with a conical flange 11 having a downwardly turned rim 11a interlocking with a lip 11b on the rim 11c forming the groove 4. The rim is made of sufficiently heavy section to provide the necessary tension grip which is aided by the interlocking provided by the rim 11a. The upper surface of the flange 11 is spaced from the lower surface of the disk to provide the desired shear section.

In the form of mounting shown in Figs. 5, 6 and 7, the rubber disk 5 is mounted on an arm 12 having an annular ring 13 received in the groove 4 in the same manner as the flange 3. The

2 ring is inserted through an opening 14 in the bottom of the groove and is held in place by the tension grip of the rubber. The thinner section 15 of the rubber on the under side of the opening 14 is not subjected to tension when the mounting is assembled, and assumes an inwardly displaced position indicated in Figs. 5 and 7. In this mounting, the load is carried in shear by the rubber between the pins 7 and the inner edge of the ring 13. In the use of the mounting two or more arms 12 are ordinarily used and arranged to project radially so that a force on one of the rubber disks tending to slide it off its arm will be resisted by one of the other arms.

In the mounting shown in Figs. 8 and 9, the flange 3 is provided with projections 16 received in openings 17 in the bottom of the groove 4. These interlocking projections and depressions 16 and 17 supplement the tension grip on the flange and more securely hold the disk in place under shock loads. In other respects the mounting is the same as that shown in Figs. 1 to 4.

What I claim as new is:

1. A mounting comprising a rubber disk having attachment provisions at the center surrounded by an inwardly presented annular groove for receiving an annular supporting member, and interlocking projections and depressions in said groove and member.

2. In a vibration absorbing mounting, a cylindrical support having an outwardly projecting flange, a rubber disk having an inwardly extending rim providing a groove receiving said flange, said disk having load attachment provisions at the center, and the part of the disk adjacent the flange flaring away from the flange to provide a shear load carrying section.

3. In a vibration absorbing mounting, a cylindrical support having an outwardly projecting flange, a rubber disk having an inwardly extending rim providing a groove receiving said flange, said disk having load attachment provisions at the center, and interlocking projections and depressions in the groove and flange.

4. In a vibration absorbing mounting, a cylindrical support having an outwardly projecting flange, a rubber disk having an inwardly extending rim providing a groove receiving said flange, said disk having load attachment provisions at the center, radial projections on the flange, and openings in the disk extending from the bottom of the groove for receiving said projections.

5. A vibration absorbing mounting comprising a rubber disk having an inwardly extending groove surrounding and spaced from attachment provisions at the center of the disk, an annular supporting member received in said groove, and a rim on said member extending away from said member into engagement with the disk for holding the disk away from said member to increase the shear section of the rubber.

6. A vibration absorbing mounting comprising a rubber disk having an inwardly extending groove surrounding and spaced from attachment provisions at the center of the disk, and a supporting member having its inner part spaced from and surrounding the attachment provisions and its outer part received in the groove, the outside diameter of the supporting member being greater than the unstressed diameter of the groove.

7. A vibration absorbing mounting comprising concentric inner and outer supporting and supported members and a rubber disk connecting the members, the disk having a folded rim providing a groove of less diameter than and stretched over the outer supporting member.

8. A vibration absorbing mounting comprising a rubber disk having an inwardly extending groove surrounding and spaced from attachment provisions at the center of the disk, an annular supporting member received in said groove, and a rim projecting laterally from the outer part of said member and interlocking with a side wall of the groove.

GUSTAV H. KAEMMERLING.